United States Patent [19]

Kettemann et al.

[11] Patent Number: 5,684,054
[45] Date of Patent: Nov. 4, 1997

[54] PROCESS FOR RECOVERING SECONDARY POLYOLS FROM POLYADDUCTS MIXED WITH NONGLYCOLYSABLE MATERIALS

[75] Inventors: Bernd-Uwe Kettemann, Thalfingen; Michele Melciorre, Blaustein, both of Germany

[73] Assignee: Daimler-Benz AG, Stuttgart, Germany

[21] Appl. No.: 532,397

[22] Filed: Sep. 22, 1995

[30] Foreign Application Priority Data

Sep. 22, 1994 [DE] Germany ............................ 44 33 834.1

[51] Int. Cl.$^6$ ................................................ C08J 11/04
[52] U.S. Cl. ........................ 521/49; 521/49.5; 528/495; 428/184
[58] Field of Search ................. 521/49, 495; 528/495, 528/49; 428/184

[56] References Cited

U.S. PATENT DOCUMENTS

| | | | |
|---|---|---|---|
| 4,159,972 | 7/1979 | Braslaw et al. | 521/49.5 |
| 4,316,992 | 2/1982 | Gerlock et al. | 521/49.5 |
| 4,317,939 | 3/1982 | Gerlock et al. | 521/49.5 |
| 4,339,358 | 7/1982 | Schutz | 521/49.5 |
| 4,511,680 | 4/1985 | Niederdellmann et al. | 521/49.5 |
| 5,274,004 | 12/1993 | van der Wal | 521/49.5 |
| 5,297,741 | 3/1994 | Zürn et al. | 241/19 |
| 5,300,530 | 4/1994 | Machado et al. | 521/49.5 |
| 5,338,763 | 8/1994 | Münzamy et al. | 521/49.5 |
| 5,357,006 | 10/1994 | Gassan et al. | 525/453 |

FOREIGN PATENT DOCUMENTS

| | | |
|---|---|---|
| 011661 | 6/1980 | European Pat. Off. |
| 2516863 | 3/1977 | Germany. |
| 3232461 | 3/1984 | Germany. |
| 4140967 | 6/1993 | Germany. |
| 4216638 | 9/1993 | Germany. |
| 4217024 | 11/1993 | Germany. |
| 5-01232 | 1/1993 | Japan .................. 521/49 |
| 1492838 | 11/1977 | United Kingdom. |

Primary Examiner—Paul R. Michl
Assistant Examiner—Olga Asinovsky
Attorney, Agent, or Firm—Evenson, McKeown, Edwards & Lenahan P.L.L.C.

[57] ABSTRACT

The invention comprises a process for recovering secondary polyols from polyadducts which contain nonglycolysable constituents. In the process, a precomminuted polyadduct starting material is pretreated with glycols in a shear reactor at elevated temperature and pressure, for a relatively short time period, the nonglycolysable constituent being further comminuted and dispersed and the polyadducts being preglycolyzed. The preproduct thus obtained is broken down in subsequent stir reactors at a somewhat elevated temperature and for longer times, first without the further addition of glycol, and then with further addition of glycol. From the secondary polyol finally obtained, a plastic can be produced which can be further processed to make plastic components.

14 Claims, 1 Drawing Sheet

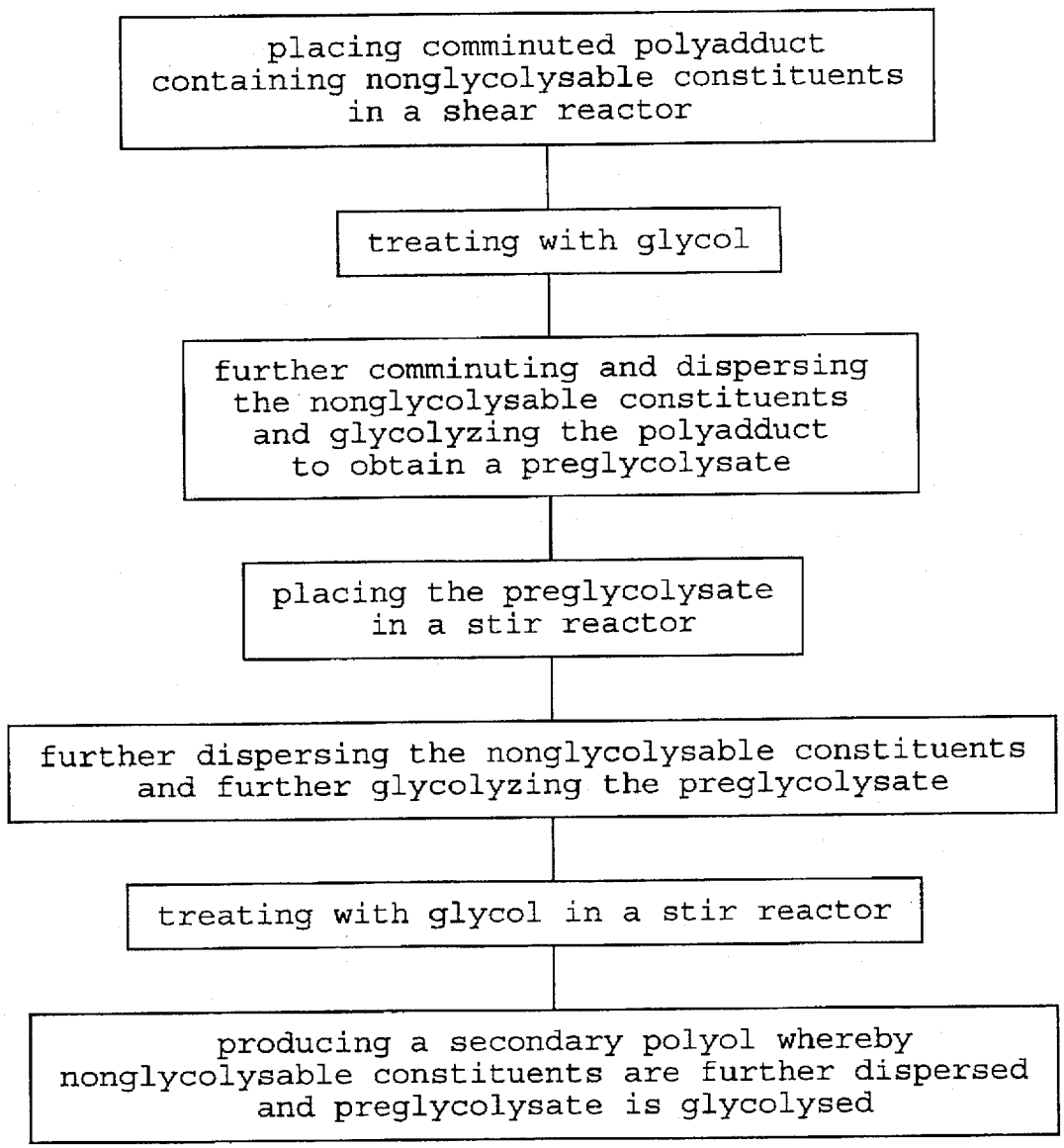

PROCESS FOR RECOVERING SECONDARY POLYOLS FROM POLYADDUCTS MIXED WITH NONGLYCOLYSABLE MATERIALS

BACKGROUND AND SUMMARY OF THE INVENTION

The invention relates to a process for reprocessing plastic waste material made of polyaddition products (i.e. addition polymerization products) of diols and diisocyanates, in particular polyurethanes (PU), and/or plastic wastes from the production of these materials, in which the starting material is first precomminuted, mixed with at least one preferably preheated glycol and reacted under heat and mechanical energy to give a polyol mixture, wherein the secondary polyol thus obtained is used as a raw material for the production of new plastic components.

PU foams are currently used alone as such or in a composite with other chemical compounds and reinforcing materials, i.e. glass fibers, in the most varied industrial products. PU foam wastes from the production of these products and also the used finished products which contain PU as a major constituent are thus constantly increasing in quantity. Constantly increasing environmental problems are therefore arising in connection with the disposal of these wastes as filling of landfills with these waste products squanders valuable natural resources.

U.S. Pat. No. 4,511,680 (counterpart to German Patent No. DE-A 3,232,461) contains a process for recovering secondary polyols from precomminuted plastic wastes which are present as a single-product type to the extent that only glycolysable components may be contained in the wastes. The glycolytic cleavage of the wastes is performed in a single treatment step in a shear reactor—apart from subsequent careful cooling and depressurization. A relatively long reaction time in the shear reactor is required, which, because of the transport effect of the contra-rotating screws of the shear reactor, is virtually unrealisable. This process cannot be used to treat "contaminated" plastic wastes, that is, those which contain nonglycolysable component materials. Such components would accumulate in the shear reactor, block it and mechanically jam it.

Numerous processes for recovering and reprocessing PU foam wastes are already known in the art in addition to U.S. Pat. No. 4,511,680, such as for example GB 1,492,838 (counterpart to German Patent No. DE-B 2,516,863), U.S. Pat. No. 5,338,763 (counterpart to German Patent No. DE-A 4,140,967), DE-A 4,217,024, EP-B 011,661 or U.S. 4,317,939. However, even with the numerous relevant patent applications or patents covering this area of technology, none of the claimed processes offer a solution to the problem which is generally satisfactory. The costs in this case must also be economically reasonable, i.e. the amount of the glycolysates used for the reaction of the comminuted starting material must be as small as possible compared to the prior art, which favorably influences not only the cost, but also the volumes to be processed.

U.S. Pat. No. 5,297,741 (counterpart to German Patent No. DE 4,216,638) describes a process for dividing up and separating stamping wastes from composite components, for example from instrument dashboards of cars, which are made of a load-bearing, fiber-reinforced core, a layer of PU foam and an outer film of thermoplastic. When the plastics are separated, the PU foam is in the form of granules with more than 30% of the total being pulverized fragments of other components mixed together with the separated PU foam granules.

An object of the present invention is to create an improved, industrially simple process for recovering secondary polyols from polyaddition products which are admixed with nonglycolysable constituents. The obtained polyols are to be directly reusable as a raw material for the preparation of novel high-quality PU products.

In general, the present invention can be summarized as follows: it is a process for recovering secondary polyols from polyadduct concentrates which contain nonglycolysable constituents. In the process, a precomminuted polyadduct concentrate is pretreated by the addition of glycols in a shear reactor at elevated temperature and pressure for a relatively short period of time, the nonglycolysable constituent being further comminuted and dispersed and the polyadducts being glycolyzed. The preproduct thus obtained is substantially completely broken down in subsequent stir reactors at a somewhat elevated temperature and for longer treatment times, first without the further addition of glycol, and then with the further addition of glycol. Finally, a plastic can be produced from the secondary polyol obtained, which can be further processed to make new plastic components.

More specifically, the invention is practiced by further comminuting a comminuted starting material containing glycolysable materials and nonglycolysable constituent at a temperature of from about 150° to 250° C., preferably from about 180° to 200° C., for about 1 to 15 minutes, preferably 1 to 5 minutes, with a first addition of at least one glycol in a weight ratio of 1 part glycol for 10 parts to 1 part, preferably 7 parts to 4 parts, comminuted starting material under the effect of shear force. This shearing process is preferably carried out in at a superatmospheric pressure of from about 5 to 300 bar, preferably from about 10 to 100 bar. As a result, the nonglycolysable constituents are comminuted and dispersed, wherein the nonglycolysable materials are comminuted to a particle size of from about 1000 to 50 µm, preferably from about 400 to 100 µm, and the glycolysable materials are glycolysed to produce a preproduct mixture. The glycolysis of the preproduct is continued in a spatially separate treatment vessel at a temperature from about 150° to 280° C., preferably from about 190° to 200° C., for about 30 to 150 minutes, preferably from about 60 to 90 minutes, with constant stirring, resulting in a preglycolysate mixture which is subsequently homogenized. Thereafter, a second addition of at least one glycol is made in a weight ratio of 1 part glycol for 10 parts to 1 part preglycolysate mixture, wherein the preglycolysate mixture is substantially broken down for a further 30 to 150 minutes at the same temperature, stirring constantly, to produce a secondary polyol. During this latter step, the nonglycolysable constituents contained in this mixture are further dispersed.

Other objects, advantages and novel features of the present invention will become apparent from the following detailed description of the invention when considered in conjunction with the accompanying drawings.

BRIEF DESCRIPTION OF THE DRAWINGS

The FIGURE is a flow chart representing an embodiment of the claimed invention.

DETAILED DESCRIPTION OF THE INVENTION

The subject matter of the invention is further described in more detail below with reference to an example:

The starting material used was a PU concentrate which results from the processing of stamping wastes from the manufacture of car instrument dashboards. This PU concentrate has roughly the following composition:

70% by weight of PU,

20% by weight of polypropylene (PP),

4% by weight of acrylic-butadiene-styrene/poly (vinyl chloride) film (ABS/PVC film), and 6% by weight of glass fibers.

In a shear reactor, a glycol mixture of diethylene glycol (DEG) and 1,2-propylene glycol (PG) was added to the PU concentrate in an amount of 20% by weight (based on the PU feed amount), and the mixture was shear-stressed for a relatively short period of time. After the shear stress, the preglycolyzed and dispersed preproduct thus obtained was stirred in a separate vessel, the first stir reactor, at a temperature of 195° C. for a period of 45 to 75 minutes.

A preglycolysate was obtained in which the other nonglycolysable pulverized constituents and the glass fibers were distributed in dispersed fashion in the liquid phase. The preglycolysate was then substantially completely glycolysed in a further stir reactor, the second stir reactor, at a constant temperature of 190° C. for a period of 45 to 75 minutes, with a glycol mixture, comprising DEG and PG, added in an amount of 30% by weight (based on the preglycolysate). The amount of the glycol mixture added to the preglycolysate in this third stage thus corresponds to a certain weight ratio of the glycol mixture added to the polyurethane wastes in the first stage.

The following analytical data was obtained for the homogeneous polyol mixture produced:

OH No. (hydroxyl equivalent weight): 398

Acid value (free organic acid): 0.31

Viscosity at 50° C.: 2,500 mpa.s

Size of the residual constituents: <300 µm

The secondary polyol obtained was mixed with suitable additives, such as water, foam catalysts and foam stabilizers, to give a chemically and dispersively stable raw product. The secondary polyol formulated in this manner was reacted, e.g. with diisocyanates, and then used in the production of conventional PU foam units which are suitable as fillers.

In a PU component produced using the secondary polyol of the present invention, the C-pillar lining for a coupe automobile, that is made from hard PU foam with a density of 300 g/m$^2$, having an inserted glass mat, the following characteristic data was determined:

Gross density: 608 kg/m$^2$

Impact strength: 17.6 mJ/mm$^2$

Bending strength: 58 N/mm$^2$

The advantages obtained by the process according to the present invention are, in particular, that plastic waste material and plastic wastes from the production of these materials can be processed from polyaddition products in an industrially simple and inexpensive procedure, wherein the secondary polyol obtained by this process can be used as raw material for the production of new, high-value PU plastic components.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for reprocessing plastic waste material made of polyaddition products of diols and diisocyanates and plastic wastes from the production of the polyaddition product, wherein for reprocessing waste which is mixed with or joined to nonglycolysable constituents, the reaction to form a secondary polyol comprises the steps of:

a) subjecting comminuted starting material at a temperature of from about 150° to 250° C. for about 1 to 15 minutes with a first addition of at least one glycol in a weight ratio of 1 part glycol for 10 parts to 1 part starting material to shear force, wherein the nonglycolysable constituents are further comminuted and dispersed and glycolysable materials are glycolysed to produce a preproduct, b) further glycolyzing the preproduct in a spatially separate treatment vessel at a temperature from about 150° to 280° C. for about 30 to 150 minutes with constant stirring, resulting in a preglycolysate which is subsequently homogenized, c) making a second addition of at least one glycol in a weight ratio of 1 part glycol for 10 parts to 1 part preglycolysate, and further glycolyzing the preglycolysate for an additional about 30 to 150 minutes at the same temperature, stirring constantly, to produce the secondary polyol, wherein the nonglycolysable materials are further dispersed.

2. The process as claimed in claim 1, wherein the polyaddition product is a polyurethane.

3. The process as claimed in claim 1, wherein the glycol is preheated.

4. The process according to claim 1, wherein the first addition of at least one glycol is in a weight ratio of 1 part glycol for 7 to 4 parts starting material.

5. The process according to claim 1, wherein in the first addition of the glycol, diethylene glycol or a mixture of diethylene glycol and 1,2-propylene glycol is added in a weight ratio of 1 part glycol for 7 to 4 parts starting material.

6. The process according to claim 1, wherein step a) occurs in a shear reactor.

7. The process according to claim 1, wherein the nonglycolysable materials are comminuted in step a) to a particle size of from about 1000 to 50 µm.

8. The process according to claim 7, wherein the particle size is from about 400 to 100 µm.

9. The process according to claim 1, wherein step a) is carried out for a period of about 1 to 5 minutes at a constant temperature of from about 180° to 200° C.

10. The process according to claim 1, wherein step a) is carried out in at a superatmospheric pressure of from about 5 to 300 bar.

11. The process according to claim 10, wherein the superatmospheric pressure is from about 10 to 100 bar.

12. The process according to claim 1, wherein step b) is carried out for a period of about 60 to 90 minutes at a constant temperature of from about 190° to 200° C.

13. The process according to claim 1, wherein steps b) and c) are carried out in a stir reactor.

14. The process according to claim 1, wherein step b) is carried out in a first stir reactor, and wherein step c) is carried out in a second stir reactor.

* * * * *